United States Patent
Kondo

(10) Patent No.: US 7,602,759 B2
(45) Date of Patent: Oct. 13, 2009

(54) WIRELESS LAN SYSTEM MAKING QUALITY OF COMMUNICATION IMPROVE AND A COMMUNICATION METHOD THEREFOR

(75) Inventor: Koji Kondo, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 652 days.

(21) Appl. No.: 11/481,248

(22) Filed: Jul. 6, 2006

(65) Prior Publication Data

US 2007/0014266 A1    Jan. 18, 2007

(30) Foreign Application Priority Data

Jul. 6, 2005    (JP)    ............... 2005-197485

(51) Int. Cl.
    *H04W 4/00*    (2006.01)
(52) U.S. Cl. .................. 370/338; 370/229; 370/230;
    370/252; 370/254; 370/329; 370/336; 370/337;
    370/348; 370/389; 370/395.2; 370/395.21;
    370/395.4; 370/395.42; 370/401; 370/442;
    370/443; 370/444; 370/445; 370/461; 709/223;
    709/224; 709/225; 709/226; 709/227; 709/228;
    709/229
(58) Field of Classification Search ................. 370/229,
    370/230, 230.1, 252, 254, 255, 328, 329,
    370/330, 336, 337, 338, 348, 351, 389, 392,
    370/395.2, 395.21, 395.4, 395.42, 401, 442,
    370/443, 444, 445, 458, 459, 461, 462; 709/223,
    709/224, 225, 226, 227, 228, 229; 455/561
    See application file for complete search history.

(56) References Cited

U.S. PATENT DOCUMENTS

| | | | |
|---|---|---|---|
| 6,115,365 A * | 9/2000 | Newberg et al. | ............. 370/312 |
| 6,404,772 B1 * | 6/2002 | Beach et al. | ................. 370/443 |
| 7,095,754 B2 * | 8/2006 | Benveniste | ................... 370/465 |
| 7,236,481 B2 * | 6/2007 | Kim | ........................... 370/338 |
| 7,319,687 B2 * | 1/2008 | Tsutsumi et al. | ............. 370/338 |
| 7,356,034 B2 * | 4/2008 | Kobayashi | ................... 370/392 |
| 7,489,666 B2 * | 2/2009 | Koo et al. | .................... 370/336 |
| 2002/0131371 A1 | 9/2002 | Rudnick | |
| 2002/0159418 A1 | 10/2002 | Rudnick et al. | |
| 2002/0163928 A1 | 11/2002 | Rudnick et al. | |
| 2003/0185186 A1 | 10/2003 | Tsutsumi et al. | |
| 2005/0089045 A1 * | 4/2005 | Shim et al. | ............. 370/395.42 |
| 2005/0265297 A1 * | 12/2005 | Nakajima et al. | ........... 370/338 |

* cited by examiner

*Primary Examiner*—Charles N Appiah
*Assistant Examiner*—Olumide T Ajibade Akonai
(74) *Attorney, Agent, or Firm*—Studebaker & Brackett PC; Donald R. Studebaker

(57) ABSTRACT

A wireless LAN system if formed by a base station, mobile stations and a controller. The controller receives a frame over wireless media, and a frame analyzer analyzes the received frame. A determination section determines whether or not the frame received at a predicted time based on the rule of frame for a service on a layer higher than a media access control layer is an intended frame based on results from the frame analyzer. A frame transmitter sends out a frame containing a field specifying the duration of the frame to be transmitted to a destination station that should be given the first priority to transmit on a wireless uplink and downlink, based on the determination that the frame received is not in conformity with the rule of frame.

7 Claims, 10 Drawing Sheets

WIRELESS LAN SYSTEM MAKING QUALITY OF COMMUNICATION IMPROVE AND A COMMUNICATION METHOD THEREFOR

BACKGROUND OF THE INVENTION

1. Field of the Invention

The present invention relates to a wireless LAN (Local Area Network) system and a communication method therefor. More specifically, the invention relates to a wireless LAN system supporting multiple classes of service requiring high priority of traffic and including a VoIP (Voice over Internet Protocol) apparatus, a moving picture communication apparatus and the like for transporting multimedia information. Further, the invention relates to a method for wireless communication in a wireless LAN system for transmitting multimedia information whose delivery should be ensured within the constraints of QoS (Quality of Service) parameters such as transmission delay and delay fluctuation.

2. Description of the Background Art

IEEE (Institute of Electrical and Electronic and Engineers) 802.11 standard defines wireless LAN operations. The wireless LAN connection supports ad-hoc and infrastructure modes. The ad-hoc mode is defined such that mobile stations (STAs) on a wireless LAN are allowed to communicate directly with each other and there are no administrative stations fixed in the network. The infrastructure mode is designed such that a wireless LAN is formed by a base station or node, which is commonly referred to as an access point (AP), through which communications are established with the mobile stations to function as an administrative station in the network.

In the wireless LAN, a frame sequence is basically designed such that an ACK (ACKnowledge) frame is transmitted in response to a unicast frame transmitted. However, when a frame such as a multicast or broadcast frame is to be transmitted to a plurality of destination stations, an ACK response is not required.

The IEEE 802.11 standard defining the infrastructure mode provides two access methods. One of the access methods is DCF (Distributed Coordination Function) using a CSMA/CA (Carrier Sense Multiple Access with Collision Avoidance) protocol. The other is PCF (Point Coordination Function) using the CSMA/CA protocol. The PCF function cooperatively control media through access points.

Each of the mobile stations under the control of DCF function is required to determine whether wireless media are free before transmitting a frame. As a result of the determination, if the mobile station determines that the wireless media are being used by another station, i.e., it is busy, the mobile station will abort the right of transmission on the wireless media to the other station until the other station completes transmission of a frame. Eventually, after the transmission of a frame completes and a back-off time has elapsed, the mobile station can transmit a frame which the station wishes to transmit. The back-off time is specific to that mobile station, and defined by a specified time interval DIFS (Distributed Inter-Frame Space) and a random number.

The master-slave relationship as formed by the PCF function is designed to include a base station, access point, or master station, with mobile stations serving as slaves is not applied to the DCF function. The DCF function is designed such that every station, including an access point, can equally access the media except for the case of the station transmitting a beacon, for example Further, under the control of PCF function, mobile stations are allowed to transmit a frame only when they receive a polling signal from an access point. In a PCF network, the right to transmit on the media is centrally managed and controlled by an access point, and therefore the stations before transmission are neither required to determine whether or not the wireless media are free, nor to wait until the back-off time is over.

In the CSMA/CA protocol defined as a primary protocol of the DCF function, there are two methods for allowing a wireless station to sense a carrier to determine whether or not the wireless media are available for transmission. One method is a physical carrier sensing in which a radio frequency (RF) module functioning as a physical layer is used to sense a carrier wave. The other method is a virtual carrier sensing which uses a network allocation vector (NAV) set in various kinds of frames transmitted on the wireless media. On a MAC (Media Access Control) layer, both methods are combined to effectively decrease the probability of collisions caused by a number of stations wishing to transmit on the media. The physical carrier sensing is implemented by the RF module, and the virtual carrier sensing is implemented by using results obtained from the MAC layer to determine the presence or absence of a carrier on the wireless media at intervals of up to one microsecond.

The latter method, i.e., the virtual carrier sensing uses the NAV vector. The NAV vector is set in all mobile stations, and is a kind of counter that starts decrementing at a constant rate to "0" immediately after a value of the NAV vector is set. The value of the NAV vector is representative of the remaining duration of a period of time during which a mobile station is scheduled to currently transmit or receive a frame on the wireless media. When the NAV vector decrements to "0", the wireless media are free, i.e., in the idle state thereof.

A mobile station of interest wishing to transmit or receive a frame sets in advance in the duration/ID field of the MAC header of a frame to be transmitted a duration scheduled by the station to occupy the wireless media after completing the transmission of a frame currently being transferred. All mobile stations other than the mobile station of interest wishing to transmit or receive a frame read the appropriate field of a frame transmitted on the wireless media, and set the value of the field in the respective NAV vectors at the time of completing the transmission of the frame. Note that if the value of the NAV vector of a mobile station at the moment of setting the NAV vector is greater than the value read from the duration/ID field of the frame being transferred, the station does not set the value read therefrom.

Next, how to control the NAV vector will be generally described. All mobile stations other than a mobile station of interest wishing to transmit or receive a frame set the value specified in a duration/ID field of a data frame in their own NAV timers at the time of completing the transmission of the data frame. The NAV timer decrements at a constant rate, and reaches the value "0" at the time of completing the transmission of an ACK frame. The duration in which the NAV timer has its count not equal to zero is the duration during which the media are busy.

A time interval between a data frame and an ACK frame is called SIFS (Short Inter-Frame Space), which is specific to the PHY layer. When only physical carrier sensing is used, the media are determined to be free for this time interval. However, when virtual carrier sensing is used, the media are determined to be continuously in the busy state thereof until the end of an ACK frame. In contrast, when transmitting data first, the NAV vector is not yet set but physical carrier sensing function is used to cause stations to recognize the busy state of the media. In this way, on the MAC layer, physical carrier sensing and virtual carrier sensing are combined to detect whether or not the media are busy, thereby significantly reducing the probability of mobile stations colliding. If the duration field of an ACK frame counts down to "0", the media are rendered free at the end of the ACK frame.

Any mobile station under the control of DCF function can exchange an RTS/CTS (Request To Send/Clear To Send) frame prior to transmission of a desired frame. This allows a mobile station to first exchange an RTS/CTS frame of short length with an actual destination mobile station and to check information on the destination mobile station and a transmission path up to the destination station. However, for example, when a data frame that the mobile station wishes to transmit is essentially short, it is less efficient to use the RTS/CTS frame, and instead the MAC layer uses a predetermined RTS/CTS threshold parameter to determine whether or not an RTS/CTS frame should be used. Basically, an RTS/CTS frame is not applied to a frame of which the length does not exceed the RTS/CTS threshold but only to a frame whose length exceeds the threshold. To an RTS/CTS frame, the NAV vector is also controlled as with an ordinary data frame and the like.

The RTS/CTS frame sequence and the NAV control will be described. In an RTS/CTS frame sequence, for the time intervals or spacing between RTS and CTS frames, between CTS and data frames and between data and ACK frames, use can be made of the short inter-frame space (SIFS) for transmission, which is the shortest interval among all the frame intervals regulated in the standard. Accordingly, if a mobile station has successfully transmitted an RTS/CTS frame, the mobile station is able to have the priority right to transmit on the wireless media to all other mobile stations trying to transmit a frame after the DIFS spacing, which is a time interval longer than the SIFS spacing. Accordingly, it is more likely for the mobile station to successfully transmit data frame/ACK frame following the RTS/CTS frame.

The value in the duration/ID field of a frame indicates a duration from completion of the transmission of the frame to completion of the transmission of an ACK frame, thus meaning that the duration/ID field of the last ACK frame contains the value of "0".

For example, as a result of virtual/physical carrier sensing, the wireless media are busy and then rendered free to allow a required time interval, typically the DIFS period, to elapse. Immediately thereafter, if plural mobile stations waiting for transmitting data try to transmit the data, then the media access by those stations collide against each other, causing the probability of collision to increase.

Thence, there are methods for avoiding collision, among which the IEEE 802.11 standard defines a collision back-off procedure. How the back-off procedure is performed will be described briefly. If three mobile stations #1, #2 and #3 are waiting to transmit data and use virtual/physical carrier sensing to determine that the wireless media are busy or involved in the DIFS period thereof beginning immediately after the busy period terminated, the mobile stations are getting ready to assign the right to transmit on the wireless media. After a frame has been transmitted and the DIFS period elapses, the media are rendered free i.e., in the idle state thereof. At this moment, if all mobile stations attempt to simultaneously transmit a frame, the timing of access is rushed into a short period of time, and therefore the probability of collision increases.

In order to reduce the probability of collision, each mobile station must refrain from transmitting on the media for the duration of a randomly chosen period, i.e., a back-off time, following the DIFS period. This allows reduction in the probability of collision between multiple media accesses.

In addition to the DCF access method previously described, the IEEE 802.11 standard for wireless media access method specifications optionally defines a PCF access method, which is usable on infrastructure network configurations. The PCF function is designed so that a master station, called a point coordinator (PC) and ordinarily serving as an access point, centrally manages the rights of individual mobile stations to transmit on the wireless media. Accordingly, unlike the DCF function, there is no conflict between individual mobile stations wishing to transmit to get the right to transmit.

Conventionally, wireless LAN systems were primarily directed to dealing with traffic of data streams. However, the recent development and deployment of multimedia technologies such as Voice over IP (VoIP) increases an ongoing need for providing wireless LAN systems with the capability to support multimedia traffic, such as audio and video, to the same extent as data traffic conventionally done.

The multimedia traffic is characterized by its periodicity and undurability to delay. Multimedia traffic periodically generated by a transmitting source may be subject to delay exceeding a threshold, fluctuation in transmission delay and/or unacceptable loss of information over a transmission network. In such a case, a destination receiver may reproduce audio and/or video data, etc., with the quality thereof degraded to a level unable to evaluate.

The aforementioned DCF access method under IEEE 802.11 is basically designed for sending an unpredictable asynchronous burst of data in an efficient manner. Accordingly, it is expected with high probability that data transmission delay varies significantly depending on contention over a network. It is considered difficult for multimedia traffic characterized by periodic and synchronous information to enjoy the advantages attained by reducing transmission delay and variance in transmission delay to maintain better QoS (Quality of Service). Further, the PCF access method under IEEE 802.11 standard is optimized for periodic and synchronous multimedia traffic. However, the PCF mode is essentially an option based on the DCF function and currently is not widely introduced. Therefore, the PCF access method does not offer a practical solution to the problems faced by wireless LAN systems.

Thus, for stations functioning under the DCF access method widely available, there is a need to reconfigure only access points so as to control the QoS of wireless LANs compatible to multimedia traffic.

Some specific proposals will be presented below. The first proposal has to satisfy a condition that, in a method for facilitating control of QoS by equipment in a wireless LAN base station in an IEEE 802.11 wireless LAN system, the base station is connected to a network to form infrastructure mode where mobile stations communicate under the control of the DCF function and is receiving a first frame from a mobile station, and further has a high-priority frame for multimedia application to transmit after receipt of the first frame. The proposal further has to satisfy an additional condition that the base station specifies in a duration/ID field of a signal responsive to the first frame a duration necessary to transmit the high-priority frame for multimedia application, and transmits the response signal.

The second proposal is that a base station sets a duration necessary to transmit a high-priority frame for multimedia application in the duration/ID field of a first frame and transmits the first frame. In the third proposal, a base station sets in a duration/ID field of a signal responsive to a first frame a duration predicted to be required for receiving a high-priority frame for multimedia application, transmits the response signal, and thereafter executes a specific sequence of causing a mobile station of interest to reset its own NAV timer. In the fourth proposal, a base station sets in a duration/ID field of a first frame a duration predicted and required for receiving a high-priority frame for multimedia application, transmits the first frame, and thereafter executes a specific sequence of causing a mobile station of interest to reset its own NAV timer.

According to these proposals, when the high-priority frame for multimedia application is transmitted and received between the base station and the mobile station, a value of non-zero is set in the duration/ID field and the specific sequence is used to cause the mobile station of interest to reset its own NAV timer, thereby remarkably increasing the probability for a base station or mobile stations to have the right to transmit on the media and thus improving the QoS.

As described above, in an application focusing on providing better QoS connection over a wireless LAN, a base station provided with a capability to control and maximize the QoS on a wireless LAN should be installed in a wireless LAN system.

Examples of how the base station controls the QoS and is installed in a wireless LAN system will be described in detail below.

U.S. patent application publication Nos. US 2002/0159418 A1, US 2002/0131371 A1 and US 2002/0163928 A1 disclose a method for assigning priority levels to wireless stations communicating in a network and providing better Quality of Service (QoS) connection to a device that conforms to the IEEE 802.11 standard. This method includes grouping stations into a polling list set, selecting a number of the grouped stations for inclusion in a polling list subset, in which preference is given to high-priority QoS stations in the polling list subset, and polling the high-priority stations during a contention-free period.

Another U.S. patent application publication, No. US 2003/0185186A1, discloses a wireless LAN system intended to improve the QoS on a transmission line. Each base station in a wireless LAN system comprises a header analyzing circuit determining a priority of data transmitted from a wireless terminal based on a priority queue table, a buffer storing data based on the determined priority, a transmission control circuit transmitting the data stored in the buffer based on the priority to a destination, and a control circuit updating the priority queue table on the basis of priority information transmitted from a host apparatus. The control circuit references the information contained in the priority queue table of the base stations, assigns priorities to the data to be transmitted to each of the wireless terminals, and transmits information indicative of the priorities assigned to the data to each base station.

Still another U.S. patent application publication, No. US 2003/0186724 A1, discloses a base station in a wireless LAN system intended to improve QoS on a transmission line. A base station comprises a memory for storing a priority data table indicative of priorities of data set for every application, a control circuit for determining the priority of received data on the basis of the table to output data having an assigned priority value to a first buffer and data having no priority to a second buffer, a beacon signal generation circuit for transmitting a beacon signal at a constant interval, and a transmission control circuit for transmitting, as indicated by the beacon interval, the data stored in the first buffer to a destination at a constant interval and after having transmitted the data stored in the first buffer, transmitting the data stored in the second buffer to a destination. A base station assigns a priority specifically to an application. The priority is assigned with a finer level than that in the conventional method. The probability that base stations concurrently receive the data having the same priority is lower, and only the same data is stored in the first buffer. The same data stored in the first buffer is transmitted at a constant interval and then the wireless terminal receives the data at a constant interval.

However, when a base station already exists in a wireless LAN network but is not provided with the aforementioned capability to control and maximize the QoS, an application utilizing the wireless LAN network and focusing on providing a better QoS connection requires the base station to be configured to support the QoS required by the application. When the base station is configured to support the QoS thus required by the application, there would be a problematic situation in which the base station will not make use of existing equipment assets in the future.

SUMMARY OF THE INVENTION

It is an object of the present invention to provide a wireless LAN system for providing QoS, which would generally be not available to stations in a wireless LAN network based upon the state of art, while making use of existing equipment assets. The present invention further aims at providing a communication method based on such a system.

In accordance with the present invention, a wireless LAN system supporting distributed coordination comprises: a base station bridging wireless and wired networks and controlling the distributed coordination; a mobile station located in a wireless area for communicating on a wireless basis in an infrastructure mode to the base station; and a controller for monitoring wireless communication in the infrastructure mode. The controller comprises a frame analyzer for analyzing a frame received on the wireless communication; a determination section for determining whether or not a frame received at a predicted time calculated on a basis of a rule of frame for a service on a layer higher than a media access control layer is an intended frame based on a result from the frame analyzer; and a frame transmitter operative in response to the determination section determining that the frame received is different from the intended frame and is not in conformity with the rule of frame for specifying a duration value in a duration/ID field of a frame to be transmitted to a destination station that should be given first priority, and sending out the frame to be transmitted.

In accordance with the present invention, the wireless LAN system comprises a base station, at least one mobile station, and a controller. The controller receives a frame over wireless media, and then the frame analyzer analyzes the frame after the frame has been monitored. The determination section determines whether or not the frame received at a time predicted based on the rule of frame for a service of a layer higher than a media access control layer is an intended frame based on results from the frame analyzer. The frame transmitter specifies a duration value in the duration/ID field of a frame to be transmitted to a destination station that should be given the first priority, based on the determination that the frame received is different from the intended frame and is not in conformity with the rule of frame, and sends out the frame to be transmitted. All other stations except the destination station set their NAV (Network Allocation Vector) timers to the duration value, and do not obtain the right to transmit, and the destination station is given the first priority to transmit.

Further in accordance with the invention, a wireless communication method in a wireless LAN system supporting distributed coordination comprises: the steps of: receiving a frame in an infrastructure mode on wireless communication on an uplink from a mobile station to a base station and a downlink wireless communication from the base station to the mobile station; memorizing wireless traffic; predicting a time when new traffic will occur based on recent history of the traffic memorized; determining whether or not a frame received at the time predicted is a frame with high priority assigned to a service of a layer higher than a media access control layer for transmission to or from one mobile station; specifying, if it is determined at the time predicted that a frame to be transmitted is different from the frame with high priority and when a signal is returned in response to the frame different from the frame with high priority, a duration/ID field of a frame to be transmitted to a destination mobile station that should be given the high priority to a duration value which disables transmission to a mobile station other than the destination mobile station; transmitting the frame to be transmitted; and setting in the other mobile station the duration value specified in the frame transmitted and disabling the transmission, and decrementing the duration value. Preferably, the method may further comprise the step of preparing a controller in the LAN system between the base station and the mobile stations, and the steps defined above may be performed by the controller.

In accordance with the present invention, the controller receives frames, memorizes wireless traffic, predicts the time when new traffic will occur based on recent history memorized, and determines whether or not a frame for a service on a layer higher than a media access control layer for transmission to or from a mobile station is a frame with high priority. If it is predicted, at the time predicted, that the frame for the service is the frame with high priority, and when a signal responsive to the first frame is returned, the controller specifies a duration value in the duration/ID field of a frame to be transmitted from the controller, so as to disable transmission from mobile stations other than the destination station, and transmits the frame to be transmitted. The other stations than the destination station set the duration vale for disabling the transmission therefrom, and decrement the duration value. The other stations than the destination station thus set the NAV timers thereof to the duration value. Since the transmission right from the other stations is disabled, the system gives the highest transmission right to the destination station with priority.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

Hereinafter, an embodiment of a wireless LAN system according to the invention will be described in detail by the aid of the embodiments with reference to the accompanying drawings. The illustrative embodiment is specifically directed to a wireless LAN system provided with a controller 10. Parts or elements not directly pertinent to the understanding the invention are omitted from the drawings and description.

Figure 1:
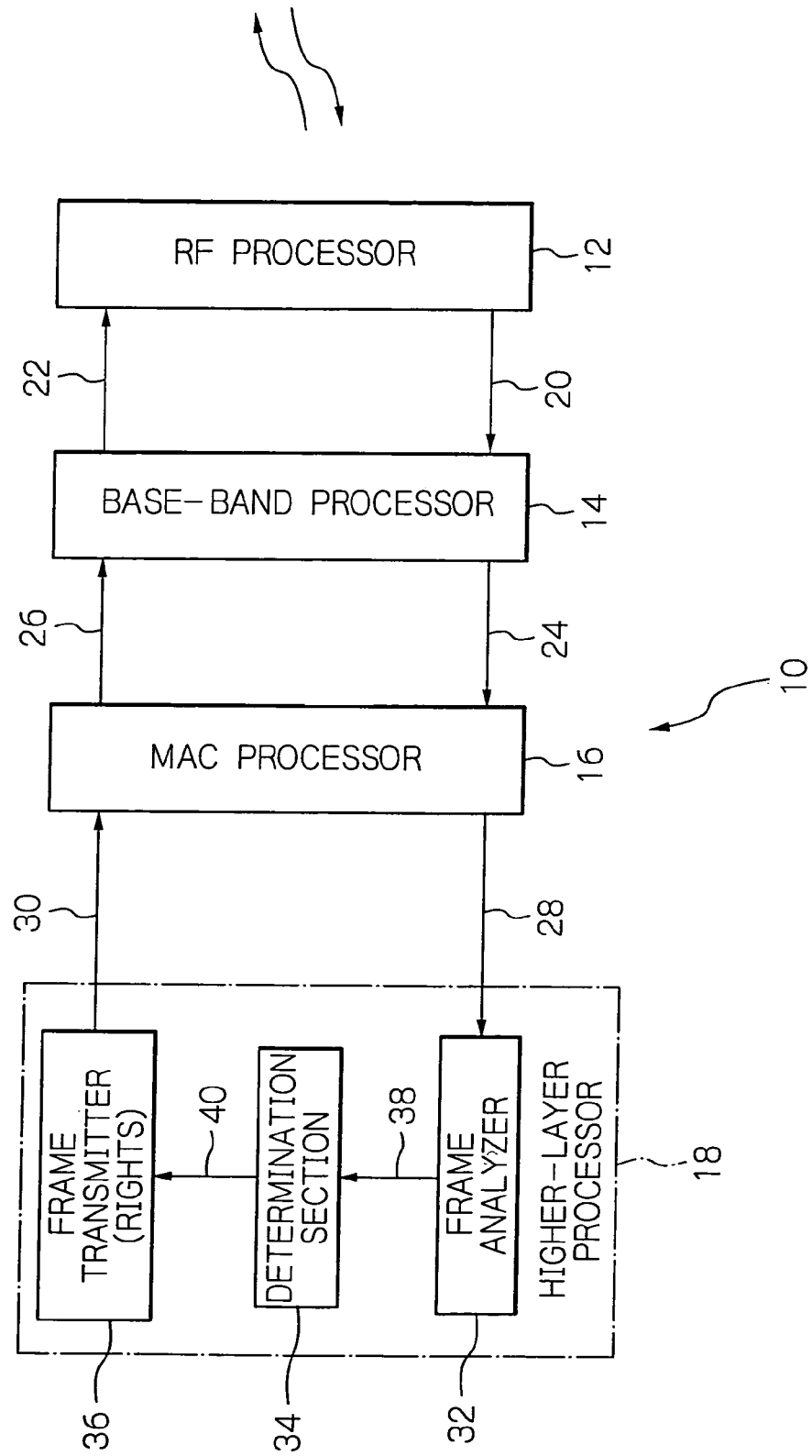
FIG. 1 is a schematic block diagram illustrating a general configuration of a controller employed in a wireless LAN system according to the invention.

With reference to FIG. 1, the controller 10 of the embodiment includes a radio-frequency (RF) processor 12, a base-band processor 14, a media access control (MAC) processor 16, and a higher-layer processor 18, which are interconnected as illustrated. The RF processor 12 is operably adapted to modulate a radio-frequency carrier prescribed on a wireless LAN to transmit the modulated carrier, and to receive a radio-frequency carrier to perform quadrature detection. The RF processor 12 outputs a signal 20, which is in turn received to the base-band processor 14. Further, the RF processor 12 receives a signal 22 transmitted from the base-band processor 14. In the following, signals are designated with reference numerals specifying connections on which they appear.

The base-band processor 14 is adapted to decode the received signal or data 20 fed from the RF processor 12 to output the decoded data 24 to the MAC processor 16, and to encode data 26 fed from the MAC processor 16 to output the encoded data to the RF processor 12.

The MAC processor 16 is adapted to extract a frame on a MAC layer for the data 24 fed from the base-band processor 14 to output data 28 of the frame extracted from the data 26, and to frame data 30 fed from the higher-layer processor 18 in conformity with the MAC layer to output the frame to the base-band processor 14.

As specifically illustrated in the figure, the higher-layer processor 18 comprises a frame analyzer 32, a determination section 34, and a frame transmitter 36, which are interconnected as shown. The frame analyzer 32 is adapted to analyze the sent data 30 to determine the source and the destination of a received packet, the contents on layers higher than the MAC layer, a service defined by a packet, and the rule of a packet defining the service. The frame analyzer 32 outputs information 38 on a result from the analysis on the rule of the service to the determination section 34.

The determination section 34 is adapted to determine whether or not the rule of frames is appropriate for the resultant information 38. If the rule of a frame is determined appropriate, then a timing at which the following frame is to be received will be predicted. The determination section 34 determines whether or not the frame received at the timing thus predicted is a frame required for the appropriate service. When the frame does not satisfy the rule, i.e., the frame received at the timing is not a frame thus intended, the determination section 34 determines the access point does not have the right to transmit on the radio or wireless media at the time an access point (AP) wishes to transmit. The determination section 34 outputs a control signal 40 to the frame transmitter 36 so that the access point is given first priority to transmit on the wireless media.

The frame transmitter 36 has a function to issue, in response to the instruction 40 from the determination section 34, a frame 30 including information for enabling a subject of priority, the access point with the instant embodiment, to acquire a transmission right with priority to transmit on the wireless media. This information is the duration value stored in a duration/ID field. The frame transmitter 36 sends out the frame 30 to the MAC processor 16.

Now, description will be made on a wireless LAN system 50 including the controller 10 to which the invention is applied. The wireless LAN system 50 operates in the infrastructure mode, and includes a base station (AP) 52, mobile stations (STAs) 54, 56, 58, and 60, and a controller (CNT) 10. Further, the access point 52 is connected to a wired LAN system 62, whereby the wireless LAN system 50 is communicably connected to the wired LAN system 62, specifically to personal computers (PC) 64 and 66 functioning as the constituent elements of the backbone network 62.

The access point 52 is a base station compatible with the existing wireless LAN system. The stations 54, 56, 58, and 60 are mobile stations compatible with the existing wireless LAN system, and adapted to transmit and receive radio frames through the access point 52. The controller 10 is what is shown in and described with reference to FIG. 1. The wireless LAN system 50 serves an area or a space enclosed by a dashed line 68.

Figure 2:
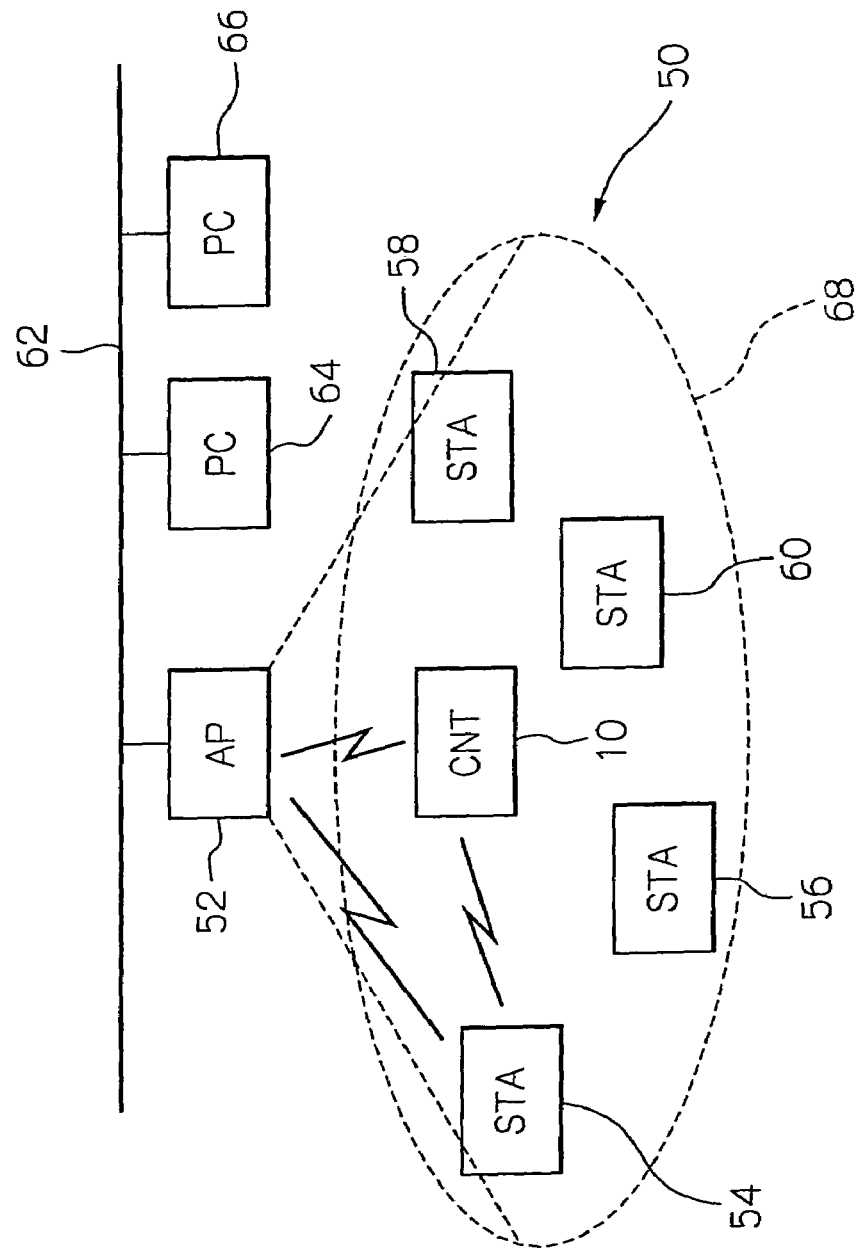
FIG. 2 is a schematic diagram showing the wireless LAN system including the controller shown in FIG. 1.

Well, the general operation of the wireless LAN system 50 in accordance with the invention will be described. In FIG. 2, for example, when a packet is sent from the personal computer 64 to the station 54, the packet travels through the wired LAN system 62 and the access point 52 to the station 54. The controller 10 stays in an area 68 of the wireless LAN system 50. The controller 10 detects and monitors a packet flow between the access point 52 and the stations 54 to 60. The monitoring process in this embodiment allows the controller 10 to capture a packet sent from the access point 52 to the station 54 and to perform signal processing on packet-based signals. The captured packet is transferred from the RF processor 12 shown in FIG. 1 through the base-band processor 14, the MAC processor 16 to the frame analyzer 32 of the higher-layer processor 18.

When this embodiment is applied to a VoIP communication, the frame analyzer 32 uses information from the controller 10 to monitor a packet stream sent from the access point 52 to the station 54. In this application, the service being provided is of a VoIP. The frame analyzer 32 analyzes a received packet. The frame analyzer 32 analyzes the rule that the frame adheres to, and provides the determination section 34 with information about the analyzed rule and information 38 on the frame. For example, when a telephonic call is placed on VoIP, telephony packets are transmitted and received in both ways between the terminals, i.e., the access point 52 and the station 54, at regular intervals of few tens of milliseconds.

When a frame sent from the access point 52 to the station 54 does not satisfy the rule of frames directed from the access point 52 to the station 54, i.e., not an intended frame, the determination section 34 determines the access point 52 has not acquired the right to transmit on the wireless media at the time the access point 52 wishes to transmit. The determination section 34 outputs a control signal 40 to the frame transmitter 36 so that the access point 52 is given first priority to transmit.

The frame transmitter 36 sends out to the wireless LAN a frame containing information on the control signal 40, sent by the determination section 34, for controlling determination of whether or not a destination station is given first priority to transmit on the wireless media. As shown in FIG. 1, the frame is transferred from the higher-layer processor 18 through the MAC processor 16, the base-band processor 14, the RF processor 12 to the air of the wireless LAN system 50. This allows the access point 52 not having the right to transmit in the wireless LAN system 50 to have a higher-priority right to transmit on the wireless media. The above described operation is basic for the access point obtaining a higher-priority right to transmit on the wireless media in the wireless LAN system 50, i.e., the operation for the downlink from the access point to the mobile stations.

On the contrary, for example, when communication is originated from the station 54 to the personal computer 64, a packet is sent from the station 54 through the access point 52 to the personal computer 64 on the wired LAN system 62. In this case, the controller 10 monitors a packet stream sent from the station 54 to the access point 52 in the manner as described above. The controller 10 determines whether or not the service is carried out according to the rule.

If the controller 10 determines the station 54 does not have the right to transmit on the wireless media at the time the station 54 wishes to transmit, the controller 10 sends a control frame to the wireless LAN system 50 such that the station 54 is given first priority to transmit on the wireless media. This allows the station 54 not having the right to transmit to have a higher-priority right to transmit on the wireless media. That is a basic operation of the station obtaining a higher-priority right to transmit on the wireless media in the wireless LAN system 50, i.e., the operation for the uplink from the stations to the access point.

Figure 3:
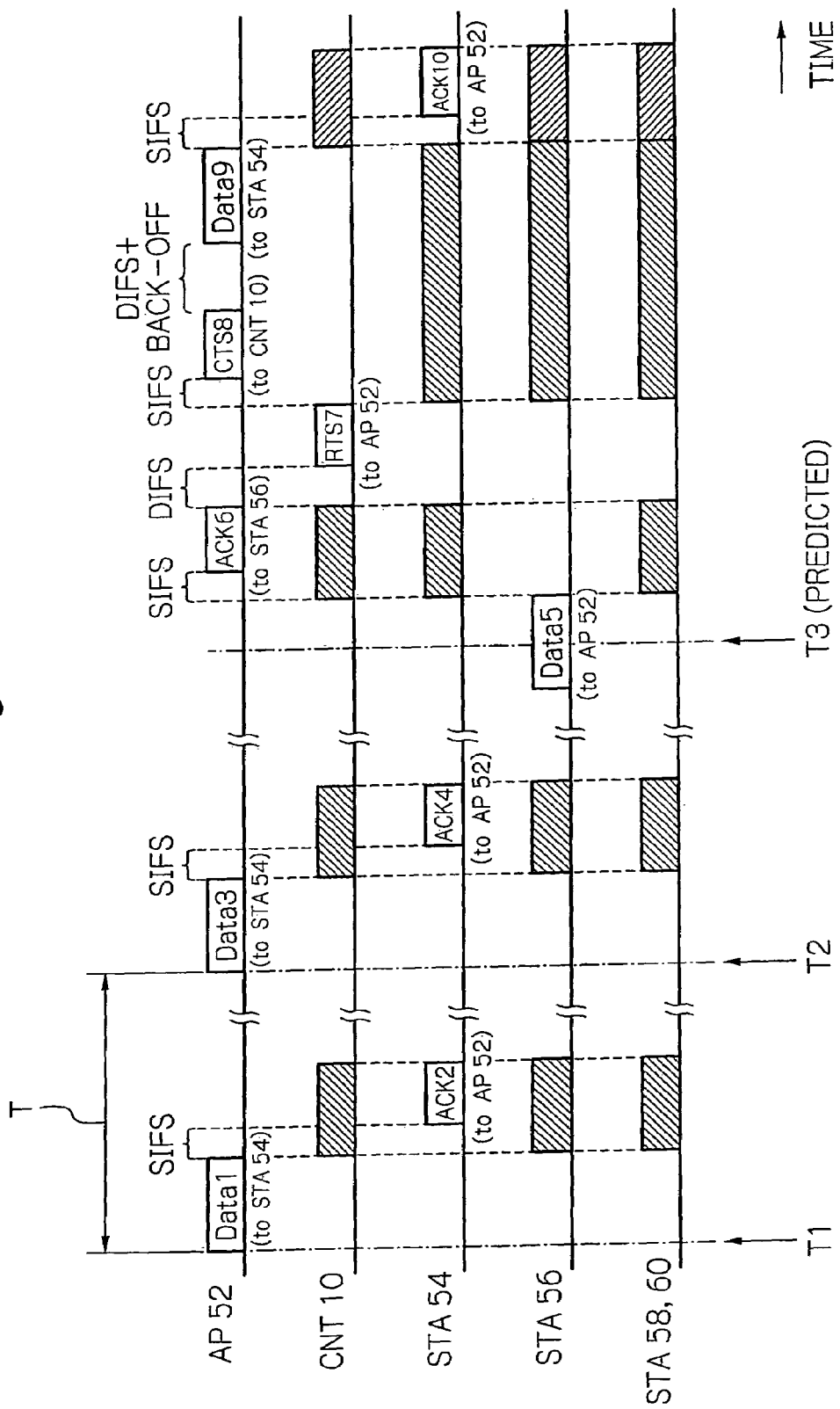
FIGS. 3 through 6 are timing charts useful for understanding how the controller of FIG. 2 allows a destination station to have the right to transmit on a downlink.

Taking into account the above-stated basic operations, description will be made to how the controller 10 operates when a VoIP telephonic call is established between the personal computer 64 connected to the wired LAN system 62 and the station 54 connected to the wireless LAN system 50. A timing chart shown in FIG. 3 is helpful for understanding how a frame is transmitted between the access point 52, the controller 10 and a mobile station. The situations on the wireless LAN system 50 will be the same as FIGS. 4, 5 and 6.

In the timing chart, data 1 and data 3 representing audio information are transmitted from the access point 52 to the station 54 at the times T1 and T2, respectively, when audio traffic occurs on the downlink. The period of a frame is represented by a time interval T. The access point 52 initially transmits the data 1 and waits a period of time, SIFS, after having transmitted the data. Then, the access point 52 transmits the data 3 and waits a period of time, SIFS, after transmission of the data. After each of the periods of time, SIFSs, the access point 52 receives acknowledgement signals ACK 2 and ACK 4 from the station 54. This allows the access point 52 to know that a frame exchange sequence is completed in the wireless LAN system 50.

The controller 10 memorizes traffic incurred from the access point 52 to the station during the telephonic call in the wireless LAN system 50, and predicts the time when the next audio traffic may occur on the downlink on the basis of the recent history, i.e., the time T1 and T2. In this case, because the data frames containing the data 1 and data 3 are sent to the station other than the controller 10 and the stations 56 through 60, the controller 10 and the stations 56 to 60 load, because of the data frames containing the data 1 and data 3 being meant to the other stations, the NAV (Network Allocation Vector) timer thereof, not shown, with a duration value specified in the data frame at the time these data frames have been completely received. This allows the controller 10 and the stations 56 to 60 to continue to decrement the NAV timer during the period, cross-hatched in the figure, timed from the loading the duration to the completion of the transmission of an ACK frame. During this period, the controller 10 and the stations 56 to 60 are not able to get the right to transmit on the wireless media. The NAV timer has its count decremented to "zero" at the same time as completing the transmission of the ACK frame, so that the controller 10 and the stations 56 to 60 are in the state of being possibly in conflict with each other, i.e., for transmitting on the wireless media.

At the time T3 when the next audio traffic occurs on the downlink, the access point 52 is receiving data 5 from the station 56. Accordingly, the access point 52 cannot immediately transmit data 9 representing audio information requested as a service. The controller 10 does not recognize the data 5 as an intended data frame. In this case, the controller 10 monitors frames and knows the access point has transmitted an ACK 6 frame sent in response to the data 5. Moreover, the controller 10 confirms that the wireless media have been in the idle state thereof during a predetermined period of time, DIFS (Distributed Inter-Frame Space). Afterwards, the controller 10 transmits an RTS (Request To Send) 7 frame to the access point 52. In the RTS 7 frame, a value of duration is set. As shown in FIG. 3, the set duration value is calculated from SIFS×2+DIFS+back-off time+transmission time of [CTS (Clear To Send) 8, Data 9 and ACK 10].

Further, the operation of the access point 52 will be described with reference to FIG. 4, in which the operation may be the same as what is shown in FIG. 3 except that the access point 52 is transmitting the data 5 to the station 56. In this case also, the data 5 transmitted at the time T3 is not the data 9 representing audio information requested for the service. In such a situation, the access point 52 cannot immediately transmit the data 9 representing audio information. Afterwards, the controller 10 knows the completion of the transmission of a response to the data 5, i.e. an ACK 6 frame addressed to the access point 52. The controller 10 verifies that the wireless media maintain the idle state thereof during the period of time, DIFS, and then transmits an RTS 7 frame to the access point 52. The RTS 7 frame has its duration value set. The thus set duration value is the sum calculated from SIFS×2+DIFS+back-off time+transmission time of (CTS 8, Data 9 and ACK 10).

It should be noted that the back-off time appearing in the formula indicated above is the back-off time determined by the access point 52, i.e., waiting time. Because the back-off time is random, the time cannot be precisely predicted, and is therefore assigned to an average value in probabilistic. The back-off time described below is determined in the same manner.

Figure 4:
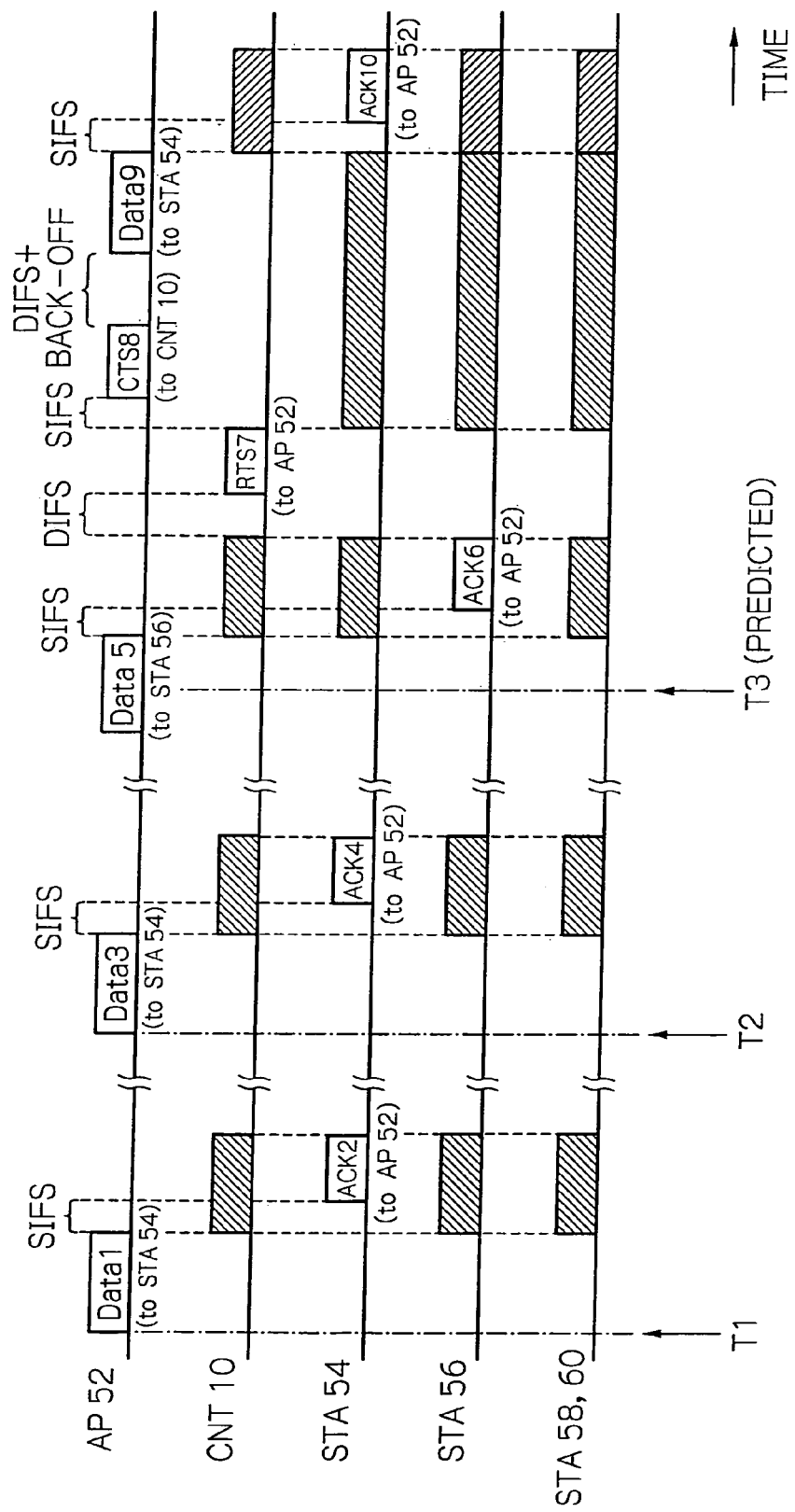

As shown in FIGS. 3 and 4, when the access point 52 receives the RTS 7 frame, it transmits the CTS 8 frame in response. Further, when the stations 56 to 60 receive the RTS 7 frame, they set their own NAV timers to the duration specified in the RTS 7 frame. Afterwards, the stations 56 to 60 initiate decrementing the NAV timers. The access point 52 is forced as usual to wait for the duration equal to the DIFS period plus the back-off time prior to transmitting the data 9 frame. However, since the stations 56 to 60 continue to decrement their NAV timers, the stations 54 to 60 would not obtain the right to transmit on the wireless media. At this time point, the access point 52 will result in getting the first priority to transmit on the wireless media.

In summary, in these cases, when the controller 10 determines the access point 52 has a high-priority frame for a multimedia application to transmit after the access point receives a frame currently being transferred, the controller 10 sets, after the period of time over which the controller 10 receives the ACK 6 frame sent from the access point 52 and the period of time, DIFS, have elapsed, the back-off time to zero as the timing for transmitting an RTS frame, in which set is a value of duration equal to the sum of SIFS×2+DIFS+back-off time+transmission time of (CTS 8, Data 9 and ACK 10). The controller 10 transmits the RTS frame thus set. The RTS/CTS sequence is performed between the controller 10 and access point 52. Because the controller 10 controls transmission in that way, the probability of the access point 52 being able to acquire the right to transmit on the media in the downlink direction significantly increases, thereby facilitating the provisioning of the downlink QoS in the wireless LAN system 50.

Figure 5:
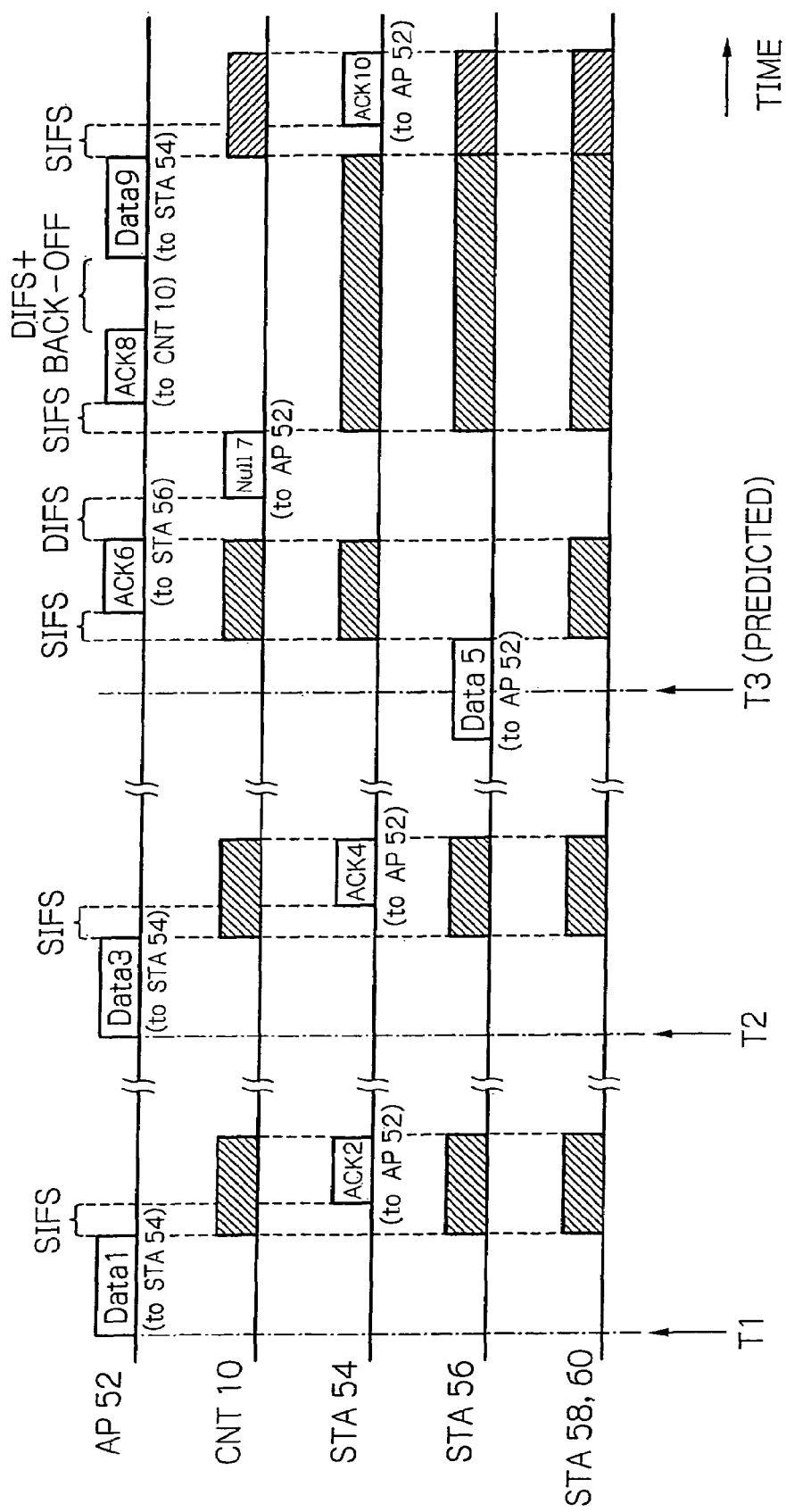
Figure 6:
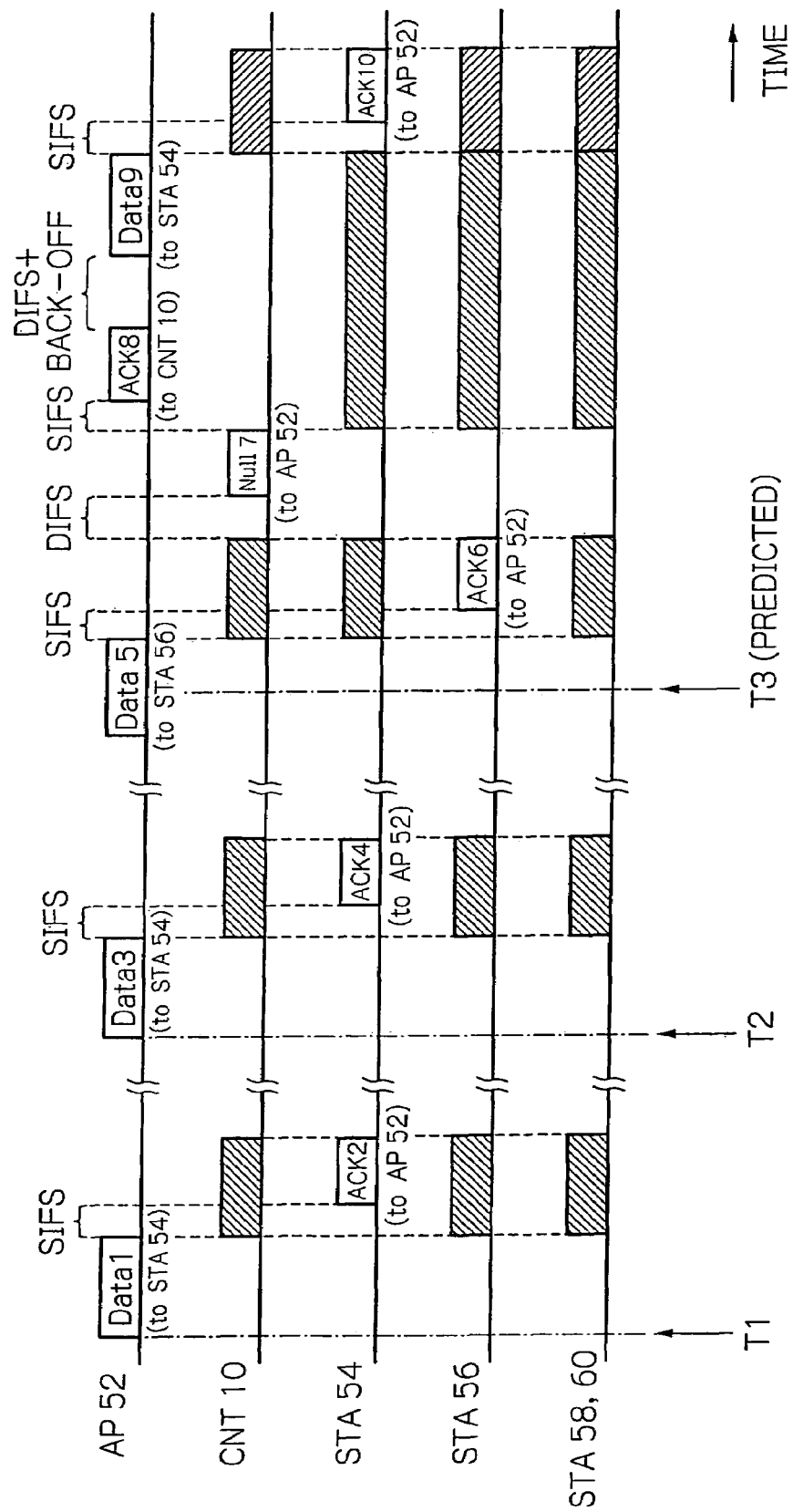

Now, with reference to the timing chart shown in FIG. 5, after the times T1 and T2, the controller 10 predicts the time T3 when the next audio traffic may occur on the downlink. At the time of this prediction, the access point 52 is receiving data 5 from the station 56 at the time T3 in the sequence shown in FIG. 5. In the sequence shown in FIG. 6, the operation of the access point 52 may be the same as shown in FIG. 5 except that the access point 52 is transmitting data 5 to the station 56. Neither of the data 5 shown in FIGS. 5 and 6 is the data 9 requested for the service. In both cases shown in FIGS. 5 and 6, the access point 52 cannot immediately transmit the data 9 including voice information.

In those cases also, at this point, the controller 10 receives and monitors an ACK 6 frame sent out by the access point 52. The ACK 6 frame is sent in response to the access point 52 receiving the data 5 from the station 56. The response allows the controller 10 to determine the completion of the transmission of the data 1 and data 3. Then, the controller 10 knows the data 5 sent at the time T3 is not a data frame requested for the service, and the controller 10 accordingly verifies the wireless media have been in the idle state thereof during the period of time, DIFS. Thereafter, the controller 10 transmits a Null 7 frame to the access point 52.

In the controller 10, a duration value is specified in the Null 7 frame. The duration value is equal to the sum of SIFS×2+ DIFS+back-off time+transmission time of (CTS 8, Data 9 and ACK 10).

The access point 52 receives the Null 7 frame and transmits an ACK 8 frame in response. Further, the stations 56 to 60 receive the Null 7 frame, and then set their NAV timers to the duration value specified in the Null 7 frame. After setting the duration, the stations 56 to 60 initiate decrementing their NAV timers. The access point 52 is caused as usual to wait for the duration equal to the period, DIFS, plus back-off time prior to the transmission of the data 9 frame. However, the stations 56 to 60 continue to decrement their NAV timers, and accordingly cannot have the right to transmit on the wireless media. Consequently, at this time point, the access point 52 wishing to transmit will resultantly be given the first priority to transmit on the wireless media.

In short, in those cases, when the controller 10 determines that the access point 52 holds a higher-priority frame for a multimedia application to transmit following the current receiving operation, the controller 10 sets, after the period of time over which the controller 10 receives the ACK 6 frame sent from the access point 52 and the period of time, DIFS, have elapsed, the back-off time to zero as the timing for transmitting the Null frame, in which set is a value of duration equal to the sum of SIFS×2+DIFS+back-off time+transmission time of (CTS 8, Data 9 and ACK 10). The controller 10 in turn transmits the Null 7 frame. The controller 10 operates the Null/ACK sequence to be performed between the controller 10 and access point 52. Because the controller 10 controls the transmission in that way, the probability of the access point 52 being able to obtain the right to transmit on the media in the downlink direction significantly increases, thereby facilitating the provisioning of the downlink QoS in the wireless LAN system 50.

Figure 7:
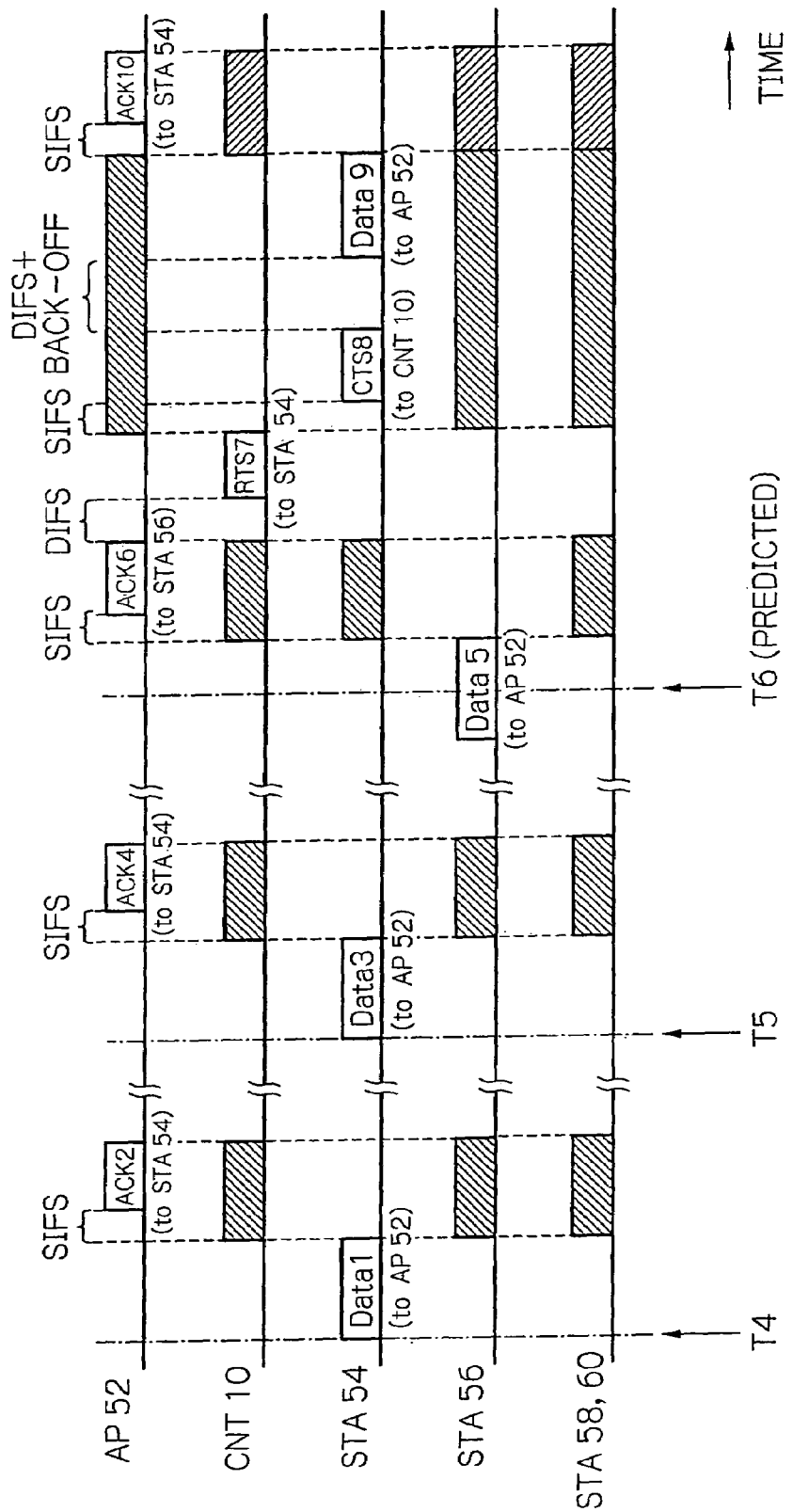
FIGS. 7 through 10 are timing chart useful for understanding how the controller of FIG. 2 allows a destination station to have the right to transmit on an uplink.

By contrast to the cases described above, attention will be directed exclusively to a case where a VoIP call is transmitted over an uplink. More specifically, it will be described how a packet containing audio information is transmitted from the station 54 through the access point 52 to the personal computer 64. As shown in FIG. 7, data 1 and data 3 representing audio information requested for the service are transmitted at the times T4 and T5, respectively, when audio traffic occurs on the uplink. The frames take place at the periodic intervals T, as described with reference to FIG. 3. The controller 10 memorizes the traffic to and from the mobile stations during a telephonic call in the wireless LAN system 50, and predicts the time T6 when the next audio traffic may occur on the uplink based on the recent history, i.e., the times T4 and T5. The situation on the wireless LAN system 50 will be the same as FIGS. 8, 9 and 10.

Figure 8:
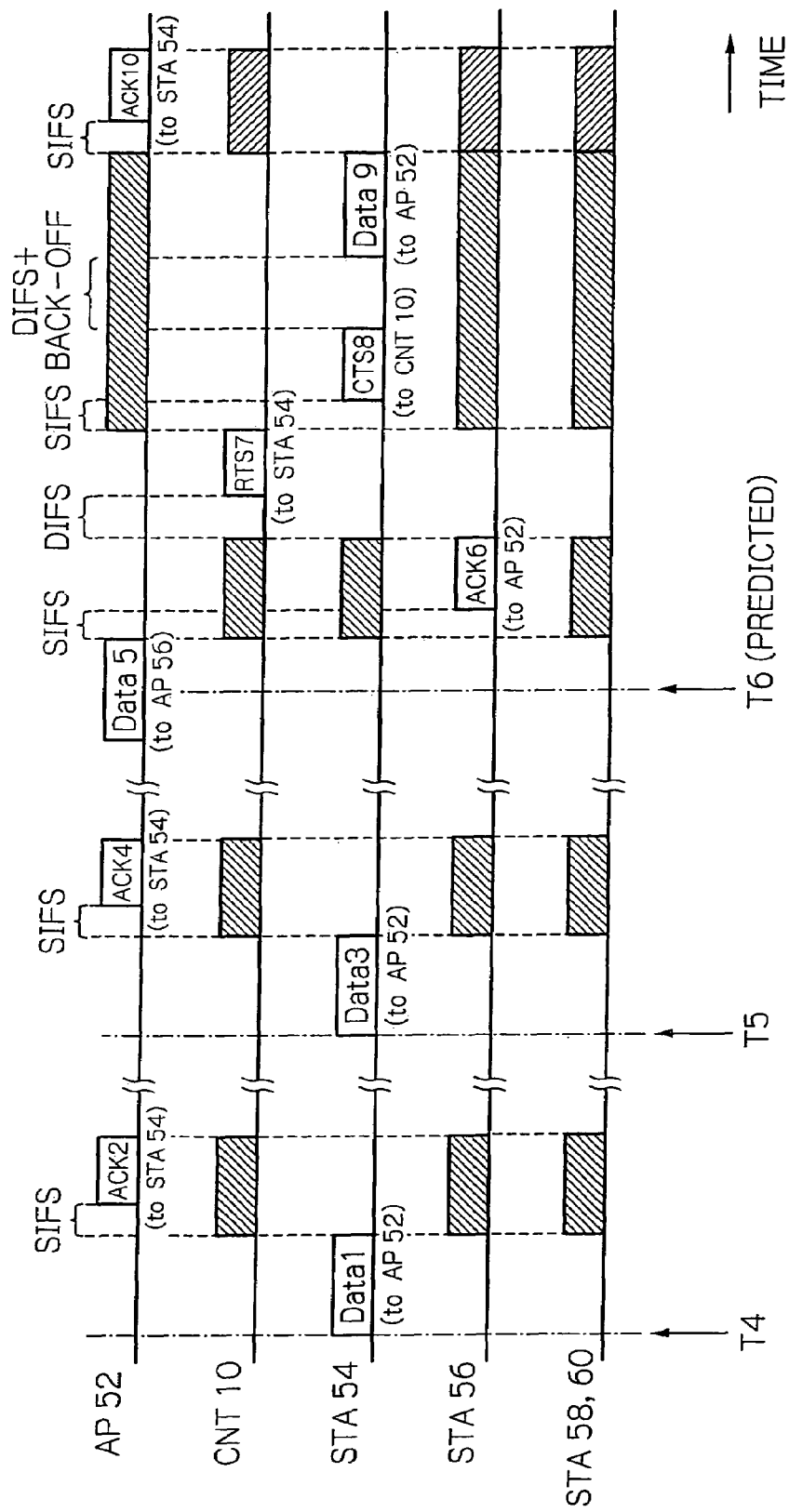

At the time T6, the access point 52 is receiving the data 5 from the station 56. At the time T6 also, the access point 52 in another case as in FIG. 8 is transmitting the data 5 to the station 56. The controller 10 knows the data 5 is not an intended data frame. Further, in these cases, the access point 52 cannot immediately receive the incoming data 9, which is audio information from the station 54.

In such a case also, the controller 10 monitors frames and knows that the station 56 has transmitted an ACK 6 frame sent in response to the data 5. Further, the controller 10 verifies the wireless media have maintained the idle state during the period of time, DIFS. Afterwards, the controller 10 transmits an RTS 7 frame to the station 54. The RTS 7 frame has its value of duration set therein. The duration value is equal to the sum of SIFS×2+DIFS+back-off time+transmission time of (CTS 8, Data 9 and ACK 10).

The mobile station 54 receives the RTS 7 frame and transmits the CTS 8 frame in response. Further, when the access point 52 and stations 56 to 60 receive the RTS 7 frame, they set their own NAV timers to the duration specified in the RTS 7 frame. In response to the duration thus set, the access point 52 and stations 56 to 60 initiate decrementing of the NAV timers. The station 54 is caused as usual to wait for the duration equal to the period, DIFS, plus back-off time prior to the transmission of the data 9 frame. However, the access point 52 and stations 56 to 60, other than the station 52, continue to decrement the NAV timers thereof. Accordingly, the access point 52 and stations 56 to 60 will not obtain the right to transmit on the wireless media during the decrementing. Consequently, the station 54 will be given the first priority to transmit on the wireless media.

In summary, in these cases, when the controller 10 determines, following the current receiving operation, one of the mobile stations has a higher-priority frame for a multimedia application to transmit, the controller 10 set, after the period of time over which the access point receives the ACK 6 frame sent from the one station and the period of time, DIFS, have elapsed, the back-off time to zero as the transmission timing of the RTS 7 frame, in which set is the duration value equal to the sum of SIFS×2+DIFS+back-off time+transmission time of (CTS 8, Data 9 and ACK 10). Then, the controller 10 controls transmission so that the RTS/CTS sequence is performed between the controller 10 and the station that should be given the first priority to transmit on the wireless media. This allows the probability of the station of interest being able to have the right to transmit on the media in the uplink direction to significantly increase, thereby facilitating the provisioning of the uplink QoS in the wireless LAN system 50.

Figure 9:
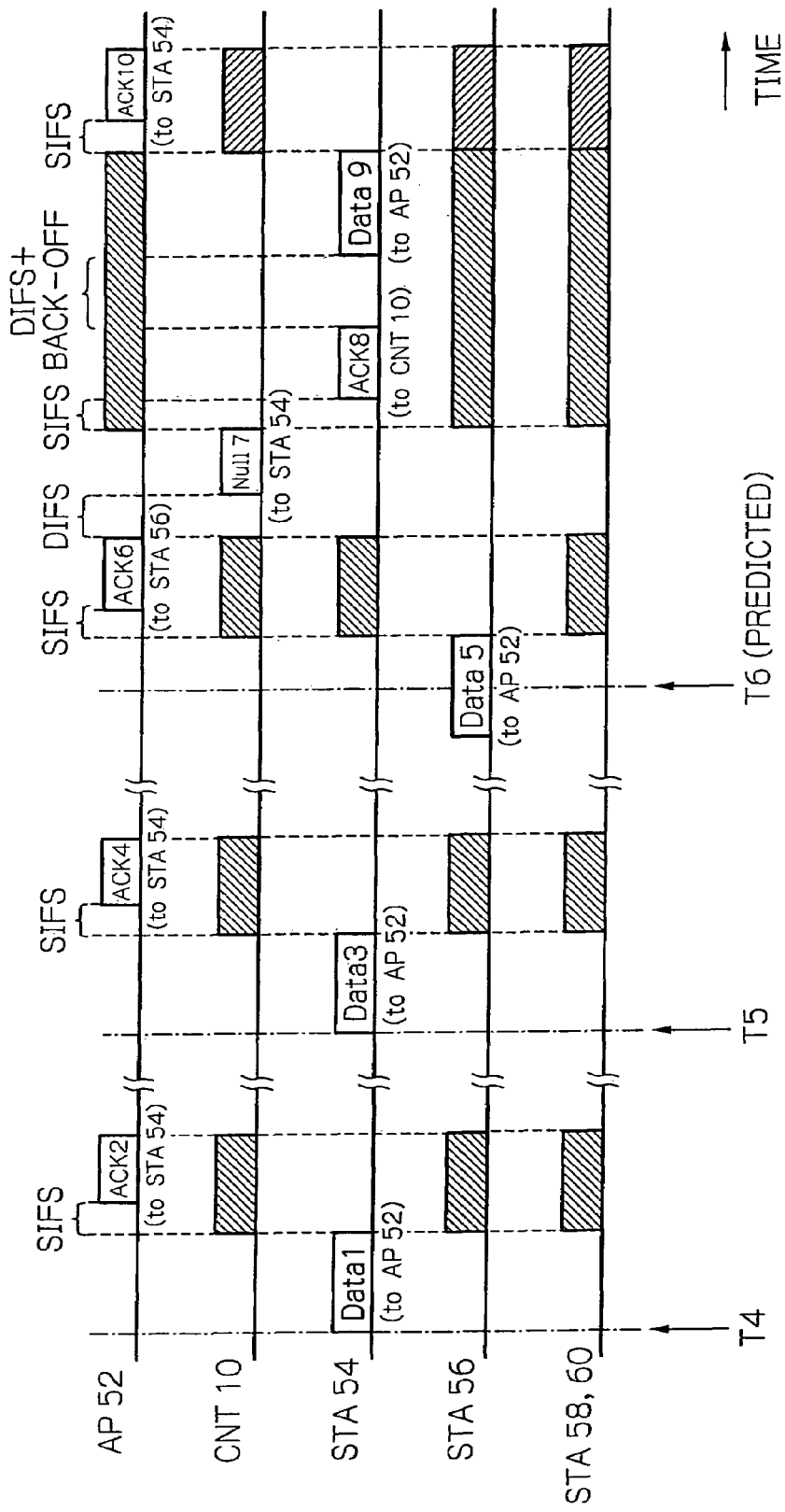
Figure 10:
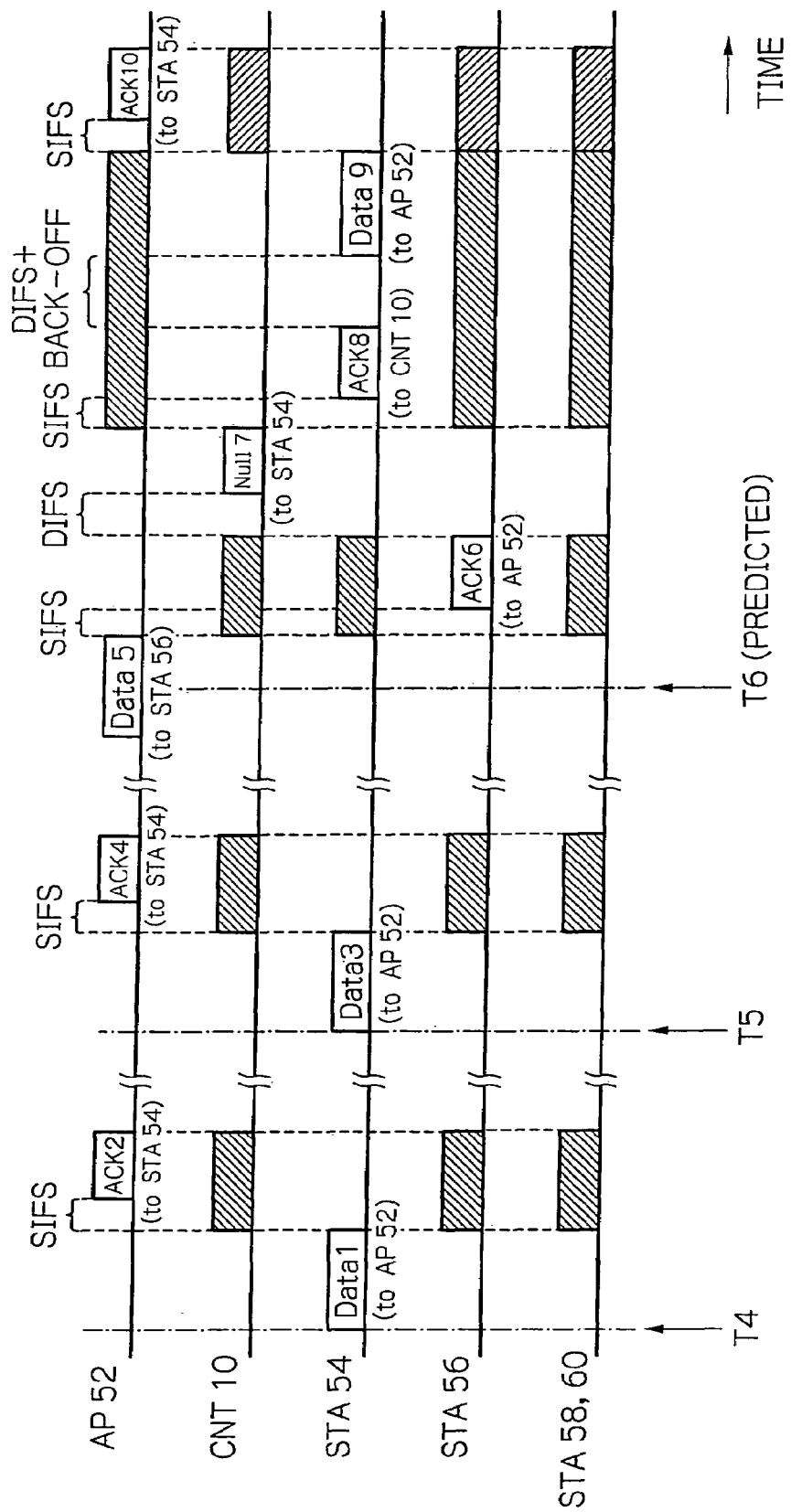

As shown in FIG. 9, data 1 and data 3 representing audio information are transmitted at the times T4 and T5, respectively, when audio traffic occurs on the uplink. The frames are transmitted at the periodic interval T. Then, the controller 10 memorizes the traffic to and from the mobile stations during a telephonic call in the wireless LAN system 50, and predicts the time T6 when the next audio traffic may occur on the uplink based on the recent traffic history.

At the time T6, the access point 52 is receiving the data 5 from the station 56. At the time T6 shown in FIG. 10 also, the access point 52 in the other case is transmitting the data 5 to the station 56. The access point 52 cannot immediately receive the incoming data 9 representing audio information requested for the service from the station 54. In this case, the controller 10 monitors frames and knows that the access point 52 has transmitted an ACK 6 frame sent in response to the data 5. The controller 10 verifies the wireless media have stayed in the idle state during the period of time, DIFS. Afterwards, the controller 10 transmits a Null 7 frame to the station 54. In the Null 7 frame, a value of duration is set. The set value of duration is equal to the sum of SIFS×2+DIFS+back-off time+transmission time of (CTS 8, Data 9 and ACK 10).

The station 54 receives the Null 7 frame and transmits an ACK 8 frame in response. Further, when the access point 52 and stations 56 to 60 receive the Null 7 frame, they set their own NAV timers to the duration specified in the Null 7 frame. In response to the duration thus set, the access point 52 and stations 56 to 60 initiate decrementing the NAV timers. The station 54 is caused as usual to wait for the duration of DIFS plus back-off time prior to the transmission of the data 9 frame. However, the access point 52 and stations 56 to 60, other than the station 52, continue to decrement their NAV timers. Accordingly, the access point 52 and stations 56 to 60 will not obtain the right to transmit on the wireless media during the decrementing. Consequently, the station 54 will resultantly be given the first priority to transmit on the wireless media.

In summary, in these cases, when the controller 10 determines one of the stations has a higher-priority frame for a multimedia application to transmit after the current receiving operation, the controller 10 sets, after the period of time over which the access point 52 receives the ACK 6 frame sent from the one station and the period of time, DIFS, have elapsed, the back-off time to zero as a transmission timing of the Null frame, in which set is the duration value equal to the sum of SIFS×2+DIFS+back-off time+transmission time of (CTS 8, Data 9 and ACK 10). Then, the controller 10 performs Null/ACK sequence between the controller 10 and the station that should be given the first priority to transmit on the wireless media. This results in significantly increasing the probability of the station of interest being able to obtain the right to transmit on a media in the uplink direction, thereby facilitating the provisioning of the uplink QoS in the wireless LAN system 50.

It should be noted that the wireless system of the invention is not limited to the illustrative embodiment of the wireless LAN system conforming to the IEEE 802.11 standard, but may be applied to a system using other types of frame, such as a unicast management frame or data frame, which is available in the instant wireless system and requires a response to be transmitted. In such cases, such frames are transmitted to an appropriate, predicted station, while the stations other than the predicted station are caused to commence decrementing their NAV timers so as to disable the right to transmit on the wireless media from being acquired, thereby allowing the predicted station to be given the first priority to transmit on the wireless media, as in the case with the above exemplified cases. Further, the duration value to be used may be equal to a period of time until starting the transmission of a predicted higher-priority frame for a multimedia application.

Moreover, it should be appreciated that a multimedia service provides audio information as well as different types of information, such as video information or data. The different types of information may be given higher priority. Specifically, a duration value depending on the types of information is specified in the duration/ID field so that a destination station is given the first priority to transmit all the types of information, only certain types of information, such as audio and video information, or only video information. The controller 10 transmits a transmission frame containing information that defines the duration value depending on the types of information to the wireless LAN system 50. In response to the frame transmitted, stations other than the destination station set their NAV timers to the specified duration. The stations other than the destination station are thus nullified with the right to transmit over the specified duration set in the stations. Accordingly, the wireless LAN system 50 allows the destination station to be given the first priority to transmit.

The entire disclosure of Japanese patent application No. 2005-197485 filed on Jul. 6, 2005, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A wireless LAN (Local Area Network) system supporting distributed coordination, comprising:
    a base station bridging wireless and wired networks, and controlling the distributed coordination;
    a mobile station located in a wireless area for communicating on a wireless basis in an infrastructure mode to said base station; and
    a controller for monitoring wireless communication in the infrastructure mode;
    said controller comprising:
    a frame analyzer for analyzing a frame received on the wireless communication;
    a determination section for determining whether or not a frame received at a predicted time calculated on a basis of a rule of frame for a service on a layer higher than a media access control layer is an intended frame based on a result from said frame analyzer; and
    a frame transmitter operative in response to said determination section determining that the frame received is different from the intended frame and is not in conformity with the rule of frame for specifying a duration value in a duration/ID field of a frame to be transmitted to a destination station that should be given first priority, and sending out the frame to be transmitted.

2. The system in accordance with claim 1, wherein the duration value is substantially equal to a period of time from completion of transmission of the frame to be transmitted from said frame transmitter to completion of response to the frame with the first priority.

3. A wireless communication method in a wireless LAN (Local Area Network) system supporting distributed coordination, comprising the steps of:
    receiving a frame in an infrastructure mode on wireless communication on an uplink from a mobile station to a base station and a downlink wireless communication from the base station to the mobile station;
    memorizing wireless traffic;
    predicting a time when new traffic will occur based on recent history of the traffic memorized;
    determining whether or not a frame received at the time predicted is a frame with high priority assigned to a service of a layer higher than a media access control layer for transmission to or from one mobile station;
    specifying, if it is determined at the time predicted that a frame to be transmitted is different from the frame with high priority and when a signal is returned in response to the frame different from the frame with high priority, a duration/ID field of a frame to be transmitted to a destination mobile station that should be given the high priority to a duration value which disables transmission to a mobile station other than the destination mobile station;
    transmitting the frame to be transmitted; and
    setting in the other mobile station the duration value specified in the frame transmitted and disabling the transmission, and decrementing the duration value.

4. The method in accordance with claim 3, wherein the frame to be transmitted is an RTS (Request To Send) frame, said method comprising the step of issuing a CTS (Clear To Send) frame in response to the RTS frame.

5. The method in accordance with claim 3, wherein said frame to be transmitted is a Null frame, said method comprising the step of issuing an ACK (ACKnowledge) frame in response to the Null frame.

6. The method in accordance with claim 3, wherein the service involves multimedia video content, audio content and data, the frame with high priority being at least one selected from a combination of video frame, audio frame and data frame with higher priority, a period of time required for transmission being set in the duration/ID field of the frame to be transmitted.

7. The method in accordance with claim 3, further comprising the step of preparing a controller in the LAN system between the base station and the mobile stations, said steps defined in claim 3 being performed by the controller.

* * * * *

UNITED STATES PATENT AND TRADEMARK OFFICE
CERTIFICATE OF CORRECTION

| | | |
|---|---|---|
| PATENT NO. | : 7,602,759 B2 | Page 1 of 1 |
| APPLICATION NO. | : 11/481248 | |
| DATED | : October 13, 2009 | |
| INVENTOR(S) | : Koji Kondo | |

It is certified that error appears in the above-identified patent and that said Letters Patent is hereby corrected as shown below:

Title Page should read
(75) Inventor: Koji Kondo, Saitama (JP)

Signed and Sealed this

Twenty-sixth Day of January, 2010

David J. Kappos
*Director of the United States Patent and Trademark Office*